United States Patent Office 2,904,444
Patented Sept. 15, 1959

2,904,444

METHOD OF MAKING CALCAREOUS-SILICIOUS INSULATING MATERIAL

Harry P. Hoopes, Berkeley, and Horst L. Weber and Jesse Ray Neal, Jr., Concord, Calif., assignors to Fibreboard Paper Products Corporation, San Francisco, Calif., a corporation of Delaware Application November 26, 1957, Serial No. 699,028

5 Claims. (Cl. 106—78)

This invention relates to calcareous-silicious heat insulating material, and more particularly to an improved method of making such material.

Relatively light weight calcareous-silicious heat insulating material particularly adapted for high temperature insulation is well known. Such material is relatively light weight compared to Portland cement and is formed from lime and silicious material reactive with the lime. The calcareous-silicious materials also generally contain reinforcing fibers, and may contain argillaceous materials such as bentonite or clay.

The process of this invention relates to the preparation of such calcareous-silicious insulating materials. It is most particularly concerned with the precision molding process described in assignee's copending application, Serial No. 655,611, filed April 29, 1957, as well as the process disclosed in assignee's Patent No. 2,432,981, dated December 23, 1947. In the usual commercial employment of this precision molding process, a relatively thin aqueous slurry of reactable calcareous and silicious materials containing reinforcing fiber, such as asbestos fiber, is preheated before it is poured into molds of the type described in such patent, and is then preset in the mold to a self-supporting mass in a relatively short time. Heat is applied to the mold during the entire presetting period. When the preset mass has set to a firm self-supporting mass, it is removed or ejected from the mold and indurated in the customary manner. Finally, the calcareous-silicious insulating material is dried free of uncombined moisture. The shape of the mold determines the form of the final product.

A strong liquid alkali is customarily incorporated in the slurry in order to accelerate presetting in the presetting mold, improve the strength of the final product, and cooperate in avoiding shrinkage of the preset mass after it is ejected from the mold and subjected to induration. However, the strong alkali tends to cause acceleration of the gelling or thickening reaction in the preheated slurry before it is poured into the mold. Also, shrinkage of calcareous-silicious materials during induration and drying is not entirely obviated with the usual accelerators, particularly when the insulation contains a high proportion of lime.

Premature gelling or thickening of the preheated slurry caused by strong alkali before it is poured into the mold is undesirable, as is explained in the aforementioned patent, since it is important that substantially all thickening of the slurry occurs undisturbed in the presetting mold from the time of substantially incipient reaction between the calcareous and the silicious materials, and that the slurry be cast into the mold prior to appreciable thickening thereof. Otherwise, too much of the calcium silicate bonding growth is destroyed resulting in weakening of the final product. Furthermore, premature thickening of the slurry before it is transferred to the presetting mold renders it difficult to transfer the slurry from the preheating vessel to the mold, and gelled material tends to adhere to the preheater and contaminate or seed subsequent batches of slurry.

In addition when the usual strong alkali accelerator is employed, a certain amount of shrinkage occurs in the insulating material and it does not retain the exact dimensions of the mold. This shrinkage problem becomes particularly acute when large amounts of lime are included in the calcareous-silicious slurry in order to increase the heat resistance of the final product. Not only is shrinkage a problem when the slurry is preheated before it is molded, but it also present difficulties in pan molding processes wherein a cold calcareous-silicious slurry is placed in pan molds, the slurry is gelled and indurated while still in the molds, and then dried.

In accordance with this invention and as a brief summary thereof, problems resulting from incorporation of a strong alkali accelerator in a calcareous-silicious slurry are obviated by employing an anhydrous alkali metal silicate accelerator selected from the group consisting of anhydrous sodium silicate and anhydrous potassium silicate in place of the usual liquid sodium hydroxide, or instead of the liquid sodium silicate accelerator which is sometimes employed. Anhydrous sodium or potassium silicates in which the ratio of the alkali metal oxide to silica is between 1 to 2 and 1 to 3.25 act as a delayed accelerator which do not promote any substantial reaction during the preheating period but which are very effective in accelerating the reaction in the presetting mold. In addition the accelerator hereof substantially minimizes shrinkage, and permits the use of larger ratios of lime to silica than could be utilized with other accelerators with a resultant increase in the heat resistance of the final product.

As a result of the delayed accelerating action obtained with anhydrous silicates, problems that were sometimes previously encountered in transferring the prematurely gelled slurry to the mold and in eliminating adherence of the slurry to the preheating apparatus are substantially obviated. Furthermore, a more uniform product is produced by employing the anhydrous silicate accelerator, since contamination and local seeding due to the presence of gelled material adhering to the preheater from previous batches is avoided, and bonding of the mass occurs substantially undisturbed in the presetting mold.

Another highly desirable result obtained by employing an anhydrous silicate accelerator is the substantial elimination of shrinkage in the preset product. Since the insulating material is molded to fit specific sizes of elements to be insulated, it is important that shrinkage of the preset material to less than the mold dimensions be minimized as much as possible. This shrinkage generally occurs during the reaction which takes place in situ when the calcareous-silicious material is indurated. Although only a small amount of shrinkage occurs when calcareous-silicious materials contain the sodium hydroxide or liquid sodium silicate accelerators previously employed, shrinkage is practically eliminated when the anhydrous sodium or potassium silicate hereof is employed.

Furthermore, it has been found that by employing the accelerator hereof, a strong light weight heat insulating material can be prepared containing larger proportions of lime to silica than could be employed with the usual strong alkali accelerators. Such a higher proportion of lime may be utilized to provide increased heat resistance of the calcareous-silicious insulating material. Generally as the proportion of lime in the insulating material is increased, the amount of shrinkage of the material compared to the mold dimensions is increased. As a result, there has previously been a substantial problem in providing an accurately molded insulation that contains a large percentage of lime so that it can withstand high temperatures without physical deterioration. This problem is present in pan molding as well as in the preheating process previously described herein. However, with the anhydrous alkali metal accelerator hereof, shrinkage is practically eliminated in the preheating precision molded process, and is substantially reduced in pan molding procedures.

Figure 1:
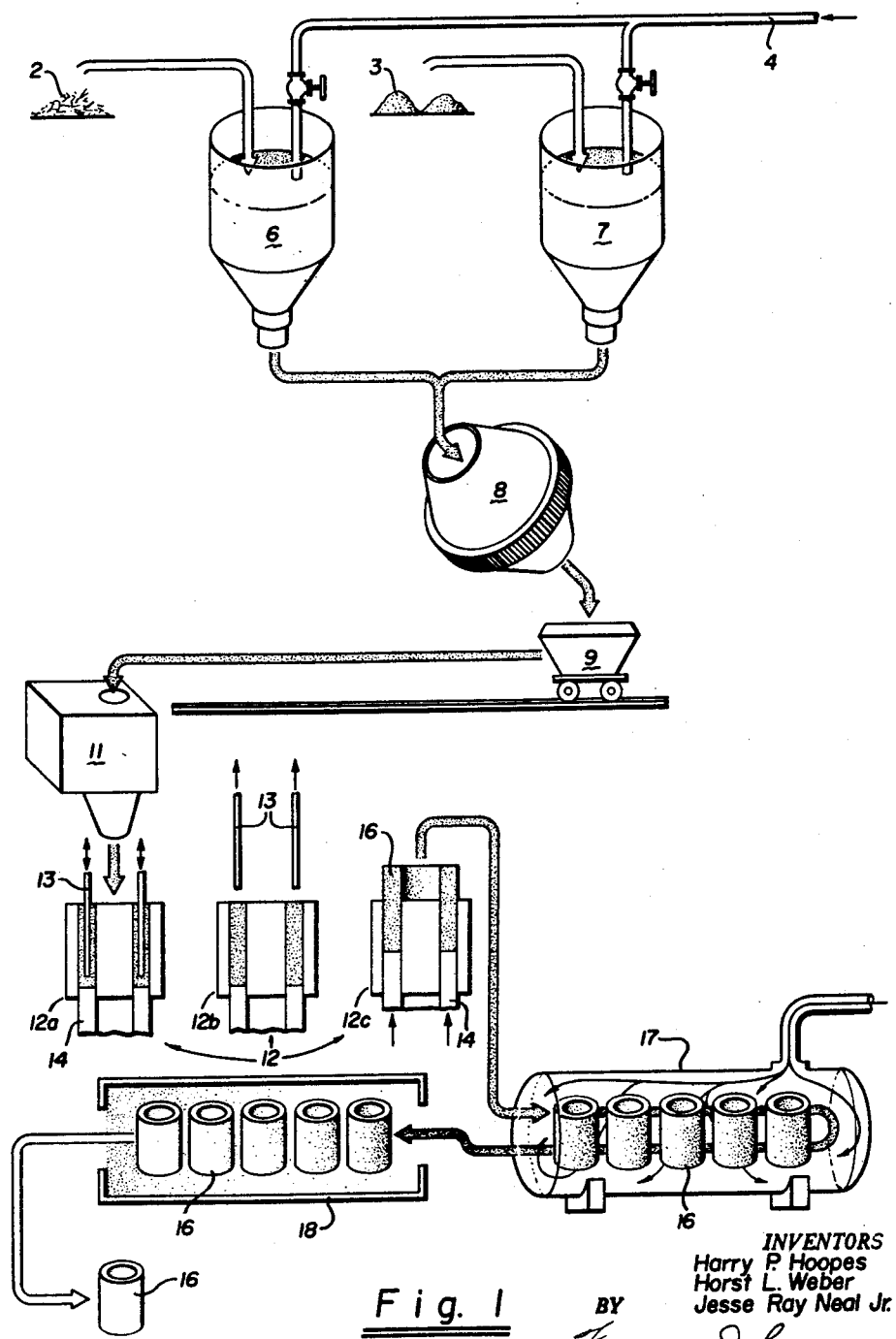
Fig. 1 is a more or less schematic flow sheet of a typical process for manufacturing calcareous-silicious heat insulating material in which the slurry is preheated.

With reference to Fig. 1, the materials employed for making the calcareous-silicious, light weight, porous, cementitious insulating materials hereof by the preheating process are conveniently separated into two groups, namely the asbestos fibers 2 in one group and the remaining materials 3 in the second group. The remaining materials 3 include calcareous materials, silicious materials, the anhydrous sodium or potassium silicate accelerator hereof and any other granular materials conventionally included in such calcareous-silicious insulation. The asbestos 2 and remaining materials 3 are respectively mixed with water conveyed through conduit 4 in separate vessels 6 and 7. About one-half of the total amount of water employed is conveniently added to the asbestos 2 and the other half of the water is added to the remaining materials 3 of the calcareous-silicious insulation. However, this step is not critical, and the order of mixing and method employed for mixing may be varied substantially.

After water has been added to the two groups of raw materials in vessels 6 and 7, the contents of the vessels are brought together and thoroughly mixed in mixer 8 to form a slurry. The mixed slurry is then transferred to a traveling scale 9, which in turn deposits the desired amount of slurry into preheating container 11. In this preheating container, the slurry is brought up to a temperature relatively close to boiling, preferably between about 195° F. and the boiling temperature of water. Temperatures lower than 195° F. may be employed for the preheating, but at temperatures below 180° F. presetting in the mold may be too slow. Furthermore, if the preheating temperature is much below 185° F. expansion of the slurry in the mold may occur upon heating of the slurry therein which tends to destroy the calcium silicate bond during the presetting. The preheating of the slurry is generally accomplished by introducing live steam directly into preheating vessel 11.

With the delayed accelerator hereof, the time for preheating is not as critical as in previous methods which employed sodium hydroxide or liquid sodium silicates. Not only does the anhydrous soduim or potassium silicate hereof eliminate gelling in the preheater, but it obviates substantial reaction between the calcareous and silicious materials in the preheater which may tend to proceed to such an extent that the final product is weaken because of breaking up of the bonding growth resulting from transferring the slurry from the preheater 11.

The mixed and preheated slurry is then poured as quickly as possible into molds 12 which are of the type illustrated in Patent No. 2,432,981 wherein the mold is heated during presetting at a temperature of between 180° F. and the boiling temperature of water until the slurry has been rapidly set to a firm self-supporting mass. This generally takes about 10 to 30 minutes. In this connection, as disclosed in Patent No. 2,432,981, elongated elements or fingers 13 are initially inserted into the mold cavity with a rapid reciprocating motion when the slurry is first poured into the mold to orient the reinforcing fiber, as illustrated by 12a. Such elements not only perform the function of orienting the fiber to improve surface appearance and mechanical strength of the final product, but also enable escape of entrapped air in the slurry. These fingers could be omitted from the process hereof, but not without loss of the advantages described. However, the process in which anhydrous sodium or potassium silicate is utilized as the accelerator is very useful when employed with any type of preheating step that might cause premature reaction before the slurry is introduced into the mold.

After the slurry has preset to a self-supporting mass in the mold with the fingers 13 removed as shown in 12b, the preset insulating material 16 is removed by ejection with ejector 14, as illustrated in 12c. Next, insulating material 16 is indurated in an indurator 17 under steam and pressure in the manner disclosed in the previously mentioned patent, and finally it is dried free of uncombined moisture by any conventional means, such as drying oven 18. Because substantially no shrinkage occurs during the presetting, indurating, and drying, the final insulating material 16 will have substantially mold smooth surfaces that are of the same size as the material which is to be insulated.

In the method of this invention the silicious material, the calcareous material reacting therewith, and the reinforcing fiber may be any of the types disclosed in the previously mentioned patents. Either dry lime hydrate or calcium oxide is generally employed as the calcareous material. As the silicious material, raw uncalcined diatomaceous earth which in its natural condition is finely divided is preferred, although any other finely divided silicious material which is reactive with the calcareous material may be employed. For example calcined diatomaceous earth, activated silica, shale, clay, marl, granite, sand and natural or artificial pozzolanic materials may be utilized. The reinforcing fiber is preferably asbestos fiber, although any other suitable non-combustible reinforcing fiber may be employed, such as mineral fibers or glass fibers.

In addition, a conventional sugar retarding agent, coloring matter or other known materials may be included in the insulating material. For example, a small amount of relatively inert coloring material such as iron oxide ($Fe_2O_3$), up to about one part by weight of the total amount of dry solids may be incorporated in the slurry to give the final product a distinctive color appearance if so desired.

Under previous practice, an alkali metal accelerator such as sodium hydroxide or liquid sodium silicate had been employed to accelerate the reaction. However, applicant has found that the substantial advantages described herein are obtained by employing anhydrous sodium or potassium silicate as the accelerator. The reaction between the calcareous and silicious material is then delayed throughout the preheating cycle until the slurry has been placed in the mold. Consequently, the action of the accelerator hereof occurs primarily in the presetting mold thereby providing optimum conditions for formation of the insulating material. Furthermore, regardless of whether the slurry is preheated and then molded, or is introduced into a pan mold while cold, the anhydrous alkali metal accelerator substantially reduces shrinkage and permits the use of larger amounts of lime than could be employed with prior accelerators.

Although there are many forms of alkali metal silicates, only anhydrous sodium or potassium silicates are utilized in accordance with the present invention. Silicates are prepared in a well known manner by melting an alkaline salt of the alkali earth metal with a silica sand in predetermined proportions. The molten product is solid anhydrous alkali metal silicate which is available commercially in the form of large pieces or relatively small granules. The rate of solution and reactivity of the anhydrous silicate depends on the proportion of alkali metal oxide to silica and the particle size of the silica. Also, solid hydrated silicates are available commercially, and such solid hydrated silicate is more soluble than a corresponding anhydrous silicate. In addition aqueous solutions of silicates are well known, and have even been utilized as accelerators for calcareous-silicious slurries. However, neither the hydrated silicates nor the silicate solutions are utilized in accordance with this invention, but the particular alkali metal silicates described herein are employed to provide the desirable results previously specified.

Anhydrous sodium or potassium silicates in which the ratio of alkali metal oxide to silica is between 1 to 2 and 1 to 3.25 are employed. When the anhydrous silicate contains greater amounts of alkali metal oxide than about 1 part $Na_2O$ to 2 parts $SiO_2$, the amount of reaction during the preheating step is increased and the benefits of the delayed reaction with the specified anhydrous silicate hereof are not obtained. On the other hand when the ratio of sodium or potassium oxide to silicon dioxide in the anhydrous silicate is such that the amount of silica is greater than a ratio of 3.25 parts silicon dioxide to 1 part sodium or potassium oxide, the solubility of the anhydrous silicate is reduced to the point where the time required for the slurry to preset to a self-supporting mass is greatly slowed and is not commercially feasible.

The effectiveness of the anhydrous alkali metal silicates as accelerators for the setting of calcareous-silicious slurries is also dependent on the particle size of the silicate. When anhydrous silicate containing a ratio of alkali metal oxide to silica of 1 to 2 is employed, the major proportion of silicate should advantageously pass through a 48 mesh W. S. Tyler Company screen (U.S. sieve series 50). Also, the major amount of this silicate should advantageously be retained on a 65 mesh W. S. Tyler screen (U.S. sieve series 70) in order that the accelerator not act too quickly. On the other hand, when the less reactive anhydrous silicate containing a ratio of alkali metal oxide to silica of 1 to 3.25 is utilized, the major proportion of the anhydrous silicate should pass through a 200 mesh W. S. Tyler Company screen (U.S. sieve series 200). Best results with anhydrous silicate containing a ratio of 1 part alkali metal oxide to about 2.58 parts silica are provided when the major proportion of the particles pass through a 100 mesh W. S. Tyler Company screen (U.S. sieve series 100). In other words the major proportion of the alkali metal silicate should pass through a 48 mesh W. S. Tyler Company screen (U.S. sieve series 50) in all cases, and smaller particle sizes should be utilized as the proportion of silica in the accelerator is increased. The amount of the anhydrous silicate employed for accelerating the reaction between the calcareous and silicious material may vary between about 1 and 20 percent by weight of the mixture.

In general the following is the preferred range of proportions of the preferred solid ingredients and parts by weight on the dry basis:

Finely divided uncalcined diatomaceous earth __ 40 to 65
Powdered dry lime hydrate or quicklime ____ 20 to 45
Reinforcing fiber (preferably asbestos) _____ 10 to 20
Anhydrous sodium or potassium silicate accelerator with $Na_2O$ to $SiO_2$ ratio between about 1:2 and 1:3.25 _____ 1 to 20
Sugar retarding agent _____ 0.1 to 3

The water to dry solids ratio may vary from about 2 to about 8 parts of water by weight to about 1 part by weight of the total amount of dry solids.

It has been found that particularly excellent insulating material is prepared with the following ingredients in about the following parts by weght on the dry basis:

| | Percent |
|---|---|
| Finely divided raw, uncalcined diatomaceous earth | 45 |
| Dry calcium hydroxide | 34 |
| Asbestos fiber | 16.5 |
| Sodium silicate (anhydrous) | 3.5 |
| Sugar | 1 |

The amount of water is four parts by weight to one part by weight of the total amount of dry solids.

Water added to the dry components of the slurry is preferably not heated until all of the ingredients of the slurry have been introduced into the water and the slurry has been thoroughly mixed. While the slurry is maintained at room temperatures, it may be stored for long periods without substantial reaction or gelling as long as the anhydrous silicate accelerator hereof is employed. However, when the usual liquid sodium hydroxide or liquid sodium silicate accelerators are employed, substantial reaction occurs even at room temperature and storage periods of the slurry are quite limited unless the alkali accelerator is maintained in a separate batch until just before the batches are to be introduced into the preheater.

Figure 2:
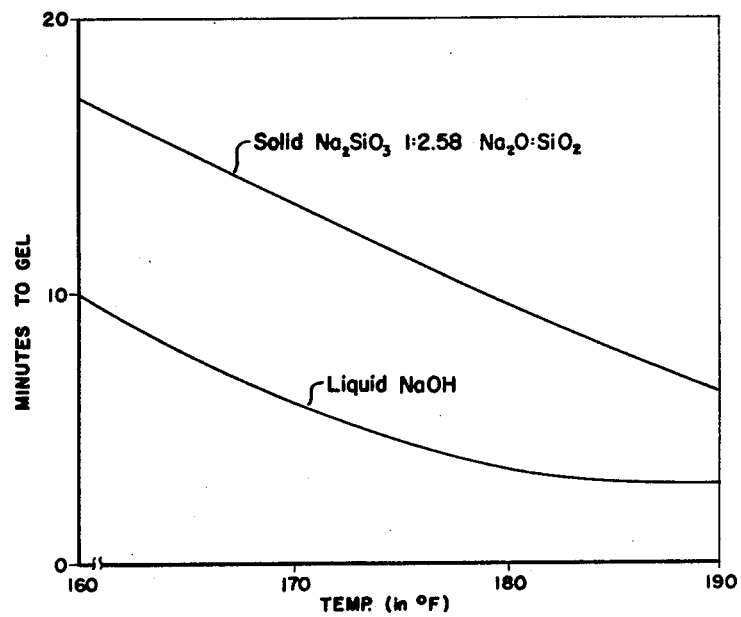
Fig. 2 is a chart comparing reaction rates of a calcareous-silicious slurry containing liquid sodium hydroxide accelerator with a similar slurry containing the solid anhydrous sodium silicate accelerator hereof.

Fig. 2 provides a vivid illustration of the effect of temperature on the gelling rate of a calcareous-silicious slurry with the solid anhydrous sodium silicate accelerator hereof, as compared to the gelling rate with the usual liquid sodium hydroxide accelerator. There is an even greater difference between the time for initial thickening as distinguished from gelling of the slurry at various temperatures with liquid sodium hydroxide accelerator compared to the thickening time with anhydrous sodium or potassium silicate, since initial thickening occurs very rapidly with liquid sodium hydroxide. Furthermore, with liquid sodium silicate both initial thickening and gelling occur much more rapdly than with either liquid sodium hydroxide or the anhydrous sodium silicate hereof.

Table I compares gelling times of a calcareous-silicious slurry with various accelerators. The data was obtained by mixing a dry blend of 46 grams diatomaceous earth, 34 grams of dry hydrated lime with accelerator and water. The total amount of water employed was 455 ml., and the amount of water mixed wth accelerator was included in calculating the total water when a solution of accelerator was employed. In each case the amount of accelerator employed was calculated to supply 2.1 grams of NaOH. Substantially all of the anhydrous sodium silicate passed through a 100 mesh W. S. Tyler Company screen (U.S. sieve series 100).

As soon as the components of the slurry were brought together in a container at time zero, the mixture was stirred for one minute at the particular temperature specified and then allowed to stand. A water bath was employed to maintain the desired temperature. At intervals, a glass test rod, 5.5 mm. in diameter by 150 mm. long, was inserted into the slurry in the container and inclined at an angle of from 20 to 30 degrees from the vertical. When the rod was supported in the container in two different locations, the time was noted as the time to gel. Data from Table I is plotted in graph form in Fig. 2 except that the gel time with sodium silicate that had previously been dissolved in water, in other words liquid sodium silicate, was so short at low temperatures that it could not conveniently be plotted on the graph. The gel times are given in minutes.

TABLE I

| | 100° F. | 125° F. | 160° F. | 170° F. | 180° F. | 190° F. |
|---|---|---|---|---|---|---|
| Anhydrous $Na_2SiO_3$, 1:2.58 $Na_2O:SiO_2$__min__ | | | 17 | 13.5 | 9.5 | 6.5 |
| Aqueous solution NaOH_____min__ | | | 10 | 6 | 3.5 | 3 |
| Aqueous solution $Na_2SiO_3$,1:3.20 $Na_2O:SiO_2$__min__ | 5 | 2½ | | | | |

Table II represents a typical change of temperature with time in preheating a calcareous-silicious slurry. The data in Table II is plotted in graph form in Fig. 3. The preheated slurry is transferred to the mold when the slurry reaches the desired temperature.

TABLE II

| Time (seconds) | 10 | 60 | 110 | 130 | 140 |
|---|---|---|---|---|---|
| Temperature, °F | 120 | 140 | 160 | 180 | 195 |

Figure 3:
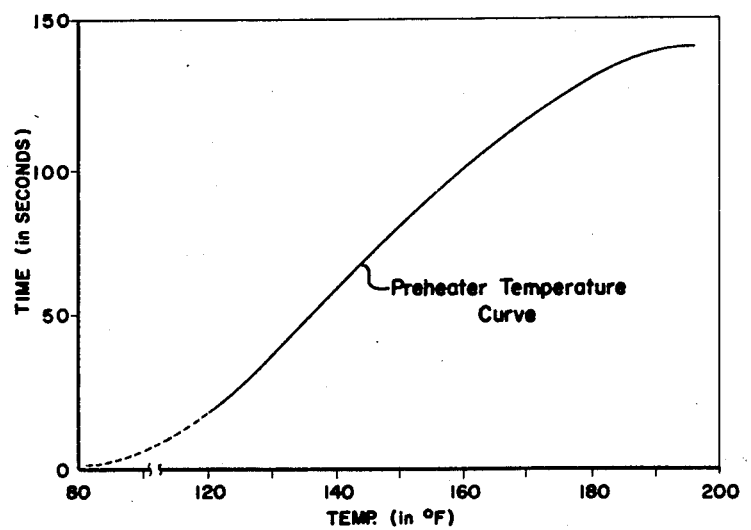
Fig. 3 is a typical time-temperature curve of a preheater employed to preheat the calcareous-silicious insulating material.

In the usual preheating of the calcareous-silicious slurry, the temperature of the slurry is gradually raised to preferably between about 195° F. and the boiling temperature of water, as shown in Table II and in Fig. 3. Consequently, Tables I and II and Figs. 2 and 3 illustrate that during preheating, the anhydrous silicate will tend to act as a delayed accelerator, and substantially prevent premature reaction and thickening.

Not only does the anhydrous sodium or potassium silicate accelerator hereof substantially eliminate the problems caused by premature thickening of a calcareous-silicious material during preheating, but also it produces an insulating material in which there is substantially no change in dimensions after the insulation leaves the mold. The calcareous-silicious materials that were preheated and employed a sodium hydroxide accelerator were excellent in this respect, and even better results are obtained with the anhydrous silicate. This feature is quite important in the production of molded insulation designed to insulate specific shapes of materials.

In the following Table III the shrinkage of mold blocks with varying amounts of calcareous materials and silicious materials, and with both liquid sodium hydroxide and anhydrous silicate accelerators are given. The data was obtained by measuring the shrinkage of a block molded to be 1½ inches by 6 inches by 36 inches. The shrinkage of the 6 inch width was measured after the insulation had been indurated and dried under identical conditions. The sole difference in each test was that an aqueous solution of sodium hydroxide accelerator was employed in one test, and in the other test anhydrous sodium silicate with $Na_2O:SiO_2$ ratio of 1:2.58 was utilized of the same particle size employed in obtaining data for Table I. The proportional amounts of the ingredients were the same, and the amount of accelerator was the same calculated on the basis of NaOH present.

TABLE III

| Ratio $CaO:SiO_2$ | Aqueous NaOH, inch | Anhydrous $Na_2SiO_3$, $Na_2O:SiO_2$ of 1:2.58, inch |
|---|---|---|
| 0.7:1 | 0 | 0 |
| 0.8:1 | 0 | 0 |
| 0.9:1 | ¼ | 0 |
| 1.0:1 | 5/16 | 0 |
| 1.1:1 | ¼ | 1/16 |

This Table III clearly illustrates the substantial reduction of shrinkage obtained with the accelerator hereof even when relatively large proportions of lime are included in the calcareous-silicious slurry. This advantage of reduced shrinkage is obtained by use of the anhydrous alkali metal silicate hereof when the insulating material is prepared by either the precision molded preheating process or by the pan molding process.

The following are specific examples of the preparation of calcareous-silicious insulating material in accordance with this invention:

Example 1

A slurry was formed from the following ingredients:

| | | |
|---|---|---|
| Calcium hydroxide (dry) | lbs | 425 |
| Diatomaceous earth | lbs | 450 |
| Asbestos fiber | lbs | 150 |
| Anhydrous sodium silicate ($Na_2O:SiO_2$, 1:2.58) | lbs | 75 |
| Inhibitor (sugar) | lbs | 2½ |
| Color ($Fe_2O_3$) | lbs | 5 |
| Water | gals | 550 |

The water was metered into two tanks, approximately ½ the volume to each tank. In one tank a slurry consisting of asbestos fibers and water was made up. The remaining ingredients were mixed with water in the other tank to make a homogeneous slurry of the reactive ingredients. 95 percent of the sodium silicate passed through a 100 mesh W. S. Tyler Company screen (U.S. sieve series 100). These slurries were held until they were ready to be molded, at which time they were blended in a mixer to form a single homogeneous mixture of all the ingredients. This slurry was then metered into the preheater as needed. In the preheater the slurry was heated to 200° F. in about 150 seconds.

The preheated material was then allowed to flow into the mold. In the mold the slurry was then preset at about 205° F., until it formed a firm self-supporting mass. Finally, the preset material was ejected from the mold, cured in an autoclave under about 200 p.s.i. steam pressure, and dried in a drying oven.

Example 2

A slurry was formed using the amounts of ingredients and procedure specified in Example 1. However, after the blended single slurry was formed, it was poured into pan molds while cold instead of preheating the slurry before introduction into the molds. The slurry was indurated while in the pans at about 200 p.s.i. steam pressure, and then dried. An excellent insulating material was formed.

Example 3

The procedure of Example 1 was repeated with the following proportions to provide an excellent precision molded material.

| | | |
|---|---|---|
| Calcium hydroxide | lbs | 350 |
| Diatomaceous earth (uncalcined) | lbs | 350 |
| Asbestos fiber | lbs | 130 |
| Anhydrous sodium silicate: | | |
| ($Na_2O:SiO_2$, 1:2) (−48 mesh, +65 mesh W. S. Tyler Company screen) | lbs | 15 |
| ($Na_2O:SiO_2$, 1:2.58) (−100 mesh W. S. Tyler Company screen) | lbs | 15 |
| Inhibitor (sugar) | lbs | 3 |
| Color ($Fe_2O_3$) | lbs | 4.4 |
| Water | gals | 400 |

Example 4

The following proportions of ingredients were employed to manufacture a precision molded insulating material following the steps described in Example 1. Substantially all of the sodium silicate passed through a 200 mesh W. S. Tyler Company Screen (U.S. sieve series 200).

| | | |
|---|---|---|
| Calcium hydroxide (dry) | lbs | 425 |
| Diatomaceous earth (uncalcined) | lbs | 450 |
| Asbestos fiber | lbs | 150 |
| Anhydrous sodium silicate, 1:3.25 | lbs | 70 |
| Inhibitor (sugar) | lbs | 2½ |
| Color ($Fe_2O_3$) | lbs | 5 |
| Water | gals | 500 |

We claim:

1. In the method of making a light weight mass of heat insulating material from an aqueous slurry consisting essentially of lime, essentially silica reactable with said lime, and non-combustible reinforcing fiber for the final product, wherein the slurry is set in a mold, and is subjected to an indurating treatment; the step comprising mixing in the slurry an accelerator selected from the group consisting of anhydrous sodium silicate and anhydrous potassium silicate to minimize shrinkage of the set insulating material from the mold dimensions, said accelerator having a mol ratio of alkali metal oxide to silica between about 1 to 2 and 1 to 3.25, and said accelerator being present in an amount of between about 1 to 20 percent by weight of the solids in said slurry on the dry basis.

2. In the method of making a light weight mass of heat insulating material from an aqueous slurry consisting essentially of lime, essentially silica reactable with said lime, and non-combustible reinforcing fiber for the final product, wherein the slurry is preheated before it is poured into a mold, is preset to a firm self-supporting mass in said mold to which heat is applied until said slurry is set to a self-supporting mass, and after such presetting is removed from the mold and subjected to an indurating treatment out of the mold; the step comprising mixing in the slurry prior to preheating of said slurry an anhydrous alkali metal silicate accelerator selected from the group consisting of anhydrous sodium silicate and anhydrous potassium silicate to enhance said presetting of the slurry in said mold while minimizing the accelerating effect during said preheating of the slurry and minimizing shrinkage of the set insulating material from the mold dimensions, said anhydrous alkali metal silicate accelerator having a mol ratio of alkali metal oxide to silica between about 1 to 2 and 1 to 3.25, and said accelerator being present in an amount of between about 1 to 20 percent by weight of the solids in said slurry on the dry basis.

3. The method of claim 2 in which the mol ratio of alkali metal oxide to silica in said anhydrous alkali metal silicate is about 1 to 2.58.

4. In the preparation of a light weight mass of heat insulating material from an aqueous slurry consisting essentially of lime, essentially silica reactable with said lime, and non-combustible reinforcing fiber for the final product, wherein the slurry is set in a mold, and is subjected to an indurating treatment; the method of providing increased heat resistance to said insulating material by mixing a high proportion of calcareous materials in said slurry while simultaneously minimizing shrinkage of the set insulating material from the mold dimensions, which comprises incorporating in the slurry from between about one to twenty percent by weight based on the total solids in the slurry of anhydrous alkali metal silicate accelerator selected from the group consisting of anhydrous sodium silicate and anhydrous potassium silicate, said anhydrous alkali metal silicate accelerator having a mol ratio of alkali metal oxide to silica between about 1 to 2 and 1 to 3.25, and said accelerator being present in an amount of between about 1 to 20 percent by weight of the solids in said slurry on the dry basis.

5. In the method of making a light weight mass of heat insulating material from an aqueous slurry containing twenty to forty-five percent by weight on the dry basis of lime, forty to sixty-five percent by weight of essentially silica reactable with said lime, and ten to twenty percent by weight of asbestos reinforcing fiber for the final product, wherein the slurry is preheated before it is poured into a mold, is preset to a firm self-supporting mass in said mold to which heat is applied until said slurry is set to a self-supporting mass, and after such presetting is removed from the mold and subjected to an indurating treatment out of the mold; the step comprising mixing in the slurry from between about one to twenty percent by weight based on the total solids in the slurry of anhydrous sodium silicate accelerator in a finely divided form which substantially all passes through a 48 mesh Tyler screen (U.S. sieve series 50) to enhance said presetting of the slurry in said mold while minimizing the accelerating effect during said preheating of the slurry and minimizing shrinkage of the set insulating material from the mold dimensions, said anhydrous sodium silicate accelerator having a mol ratio of $Na_2O$ to $SiO_2$ between about 1 to 2 and 1 to 3.25.

References Cited in the file of this patent

UNITED STATES PATENTS

| | | |
|---|---|---|
| 2,432,981 | Abrahams et al. | Dec. 23, 1947 |
| 2,554,934 | Ayers | May 29, 1951 |
| 2,698,251 | Shea et al. | Dec. 28, 1954 |
| 2,716,070 | Seipt | Aug. 23, 1955 |